(12) United States Patent
Sanders

(10) Patent No.: US 8,438,765 B2
(45) Date of Patent: May 14, 2013

(54) REMOVABLE LICENSE PLATE PROTECTOR

(76) Inventor: Robert Laverne Sanders, Bell, FL (US)

( * ) Notice: Subject to any disclaimer, the term of this patent is extended or adjusted under 35 U.S.C. 154(b) by 119 days.

(21) Appl. No.: 12/750,880

(22) Filed: Mar. 31, 2010

(65) Prior Publication Data

US 2011/0239496 A1 Oct. 6, 2011

(51) Int. Cl.
*G09F 7/00* (2006.01)

(52) U.S. Cl.
USPC .............................................. 40/209; 40/200

(58) Field of Classification Search .............. 40/209, 40/210; 293/142, 115
See application file for complete search history.

(56) References Cited

U.S. PATENT DOCUMENTS

| 4,226,438 | A | | 10/1980 | Collins |
| 4,287,676 | A | * | 9/1981 | Weinhaus .................. 40/661.01 |
| 5,623,776 | A | | 4/1997 | Lucier |
| D435,241 | S | * | 12/2000 | Brantley ..................... D12/401 |
| 6,305,656 | B1 | * | 10/2001 | Wemyss .................... 248/309.4 |
| 6,976,694 | B1 | | 12/2005 | Rayl et al. |
| 7,210,255 | B2 | * | 5/2007 | Blackburn ..................... 40/209 |
| 7,316,433 | B2 | | 1/2008 | Levine |
| 7,950,706 | B2 | * | 5/2011 | Shaw et al. .................. 293/142 |
| 8,267,462 | B2 | * | 9/2012 | Bogdan .................... 296/136.02 |
| 2005/0195615 | A1 | * | 9/2005 | Takenaka ..................... 362/546 |
| 2006/0156595 | A1 | * | 7/2006 | Kasak et al. .................. 40/209 |
| 2007/0169389 | A1 | * | 7/2007 | Hoffman ........................ 40/209 |
| 2008/0229634 | A1 | * | 9/2008 | Collins ........................... 40/209 |

FOREIGN PATENT DOCUMENTS

| CN | 2181435 | 11/1994 |
| GB | 2437779 A | 7/2007 |

* cited by examiner

*Primary Examiner* — Joanne Silbermann
*Assistant Examiner* — Christopher e Veraa
(74) *Attorney, Agent, or Firm* — David L King

(57) ABSTRACT

A removable license plate protector 10 has an outer impact plate 12, an impact bumper 14 and at least one permanent magnet 20. The impact plate 12 is the size of a license plate 22 or slightly greater. The impact bumper 14 is made of a resilient material permanently affixed to an inner surface of the impact plate 12. The at least one permanent magnet 20 is permanently affixed to an exterior surface of the impact bumper 14. The at least one permanent magnet 20 is positioned to attach magnetically to a metal license plate 22 thereby providing an easy attachment and detachment of the license plate protector 10 to the license plate 22.

12 Claims, 2 Drawing Sheets

REMOVABLE LICENSE PLATE PROTECTOR

TECHNICAL FIELD

This invention relates to a license plate protector for protecting a license plate from impacts. More specifically the license plate protector is designed to be removably attached to metal license plates.

BACKGROUND OF THE INVENTION

It is common practice when towing a vehicle to provide a trailer hitch or in some cases a ball mechanism on the rear bumper of the vehicle in close proximity to the license plate. These attachment locations for trailers while convenient at providing a secure means for attaching a trailer for pulling a boat or any other purpose are well known in the art. It has been routinely discovered when a driver attempts to back his vehicle up during the procedure of attaching a trailer to his vehicle that the trailer attachment location or tongue can impact into the vehicle license plate or bumper. If the driver is moving sufficiently swiftly or if the trailer is holding a sufficiently large load, a tremendous impact load is created such that the bumper and or license plate can be damaged.

In order to prevent this, various devices have been created, in particular trailer hitch guides have been provided where an angular or v shaped device is mounted and secured by the ball hitch on the rear of a bumper such that when the tongue of the trailer approaches the vehicle during attachment or as the vehicle approaches the tongue of the trailer, the tongue is guided into a location that will force the tongue into the location in proximity of the ball. This is as shown in U.S. Pat. No. 4,226,438. The disadvantage of this device is that it is permanently affixed to the bumper and while the guide is there, it can block a large portion of the vehicle license plate from view. In many states anything obstructing the view of the license plate is considered an illegal obstruction of view for law enforcement and is not permitted. Secondarily if the device is made sufficiently low, so as to avoid obstructing the license plate, the tongue will invariably ride over the top of the guide and still impact and damage the license plate. In U.S. Pat. No. 6,976,694; a trailer hitch including a "V" guide is similarly shown. In this case the "V" guide is attached to a removable hitch assembly commonly referred to as a Reese hitch assembly such that the "V" guide provides a means of directing the tongue of a trailer towards a ball hitch for securing the trailer. This has some advantages in providing a guide for hooking up a trailer, however it does little for protecting a license plate.

In U.S. Pat. No. 7,316,433 a license frame bumper guard was designed with a semi-circular projection extending around a license plate frame such that the license plate frame and license plate could be mounted to the vehicle and any impacting car or other obstruction would preferably hit the bumper mounted to the frame. The disadvantage of this device is again it is permanent and secondarily it is provided in a location at the lower extreme of the license plate such that the impact of a trailer tongue hitting the license plate is not prevented and damage and bending of the license plate can still occur as the tongue will simply ride over the top of the bumper directly impacting the plate.

Further ways of protecting license plates include providing one piece transparent license plate protectors of a heavy rigid plastic that would go over the exterior of an entire license plate. While these exterior covers made of high impact strength polycarbonate resins remain substantially transparent and damage resistant during use and do provide some protection for the license plate, it is noted that these are permanent type devices that can discolor over time and generally can cause a reflection that obscures the view and are therefore considered illegal in several states.

A vehicle plate protector and cleaner is described in UK patent application GB 2437779 wherein layers of thin film are adhesively attached over a license plate wherein the layers of thin film can be peeled off as the film discolors with age. The disadvantage of this type of solution to protecting license plates is it does nothing to protect the license plate in the case of a severe impact.

The object of the present invention is to provide a secure and reliable means of protecting a license plate when attaching a trailer to a vehicle. Another object of the present invention is to ensure that the vehicle license plate protector is easily attached and detached from the vehicle license plate and only used during the attachment of the trailer to the vehicle. Thereafter the device can quickly and easily be removed from the license plate as it is no longer needed. By eliminating license plate protectors that are permanently attached to the license plate, the user ensures that his license plate is protected when most needed, but also ensures that the plate protector does not provide an impediment to easy viewing of the license plate during normal use. These and other objectives are described in the application as follows.

SUMMARY OF THE INVENTION

A removable license plate protector has an outer impact plate, an impact bumper and at least one permanent magnet. The impact plate is the size of a license plate or slightly greater. The impact bumper is made of a resilient material permanently affixed to an inner surface of the metal impact plate. The at least one permanent magnet is permanently affixed to an exterior surface of the impact bumper. The at least one permanent magnet is positioned to attach magnetically to a metal license plate thereby providing an easy attachment and detachment of the license plate protector to the metal license plate.

Preferably, the impact plate can be made of metal having a gauge thickness of at least 0.030 inches or a plastic material such as a polycarbonate, polyethylene, or ABS or any other plastic of sufficient impact resistance and thickness and the impact bumper is an elastomeric material permanently bonded, glued or molded onto the inner surface of the impact plate. The elastomeric material of the impact bumper is made from rubber, urethane or other thermoplastic composition have sufficient resiliency to compress under impact.

In one embodiment of the invention the removable impact bumper has a plurality of ribs spaced by grooves, the ribs being affixed to the inner surface of the impact plate and the grooves provide voids to allow the impact plate to flex under impact loads. The removable impact bumper preferably has a plurality of contact bumps or projections spaced on an exterior surface of the impact bumper for compressing against a license plate when the license plate protector is impacted.

Preferably the at least one permanent magnet projects outwardly from the impact bumper surface and is located near an edge of the impact bumper to enable the magnet to attach to a top surface of a license plate. The removable license plate protector may have two or more permanent magnets, more preferably four or more permanent magnets, one attached near corners of the impact bumper. The removable license plate protector can use six or more permanent magnets around peripheral edges of the impact bumper, wherein the permanent magnets are round disks bonded, molded into or otherwise affixed to the impact bumper.

DETAILED DESCRIPTION OF THE INVENTION

Figure 1:
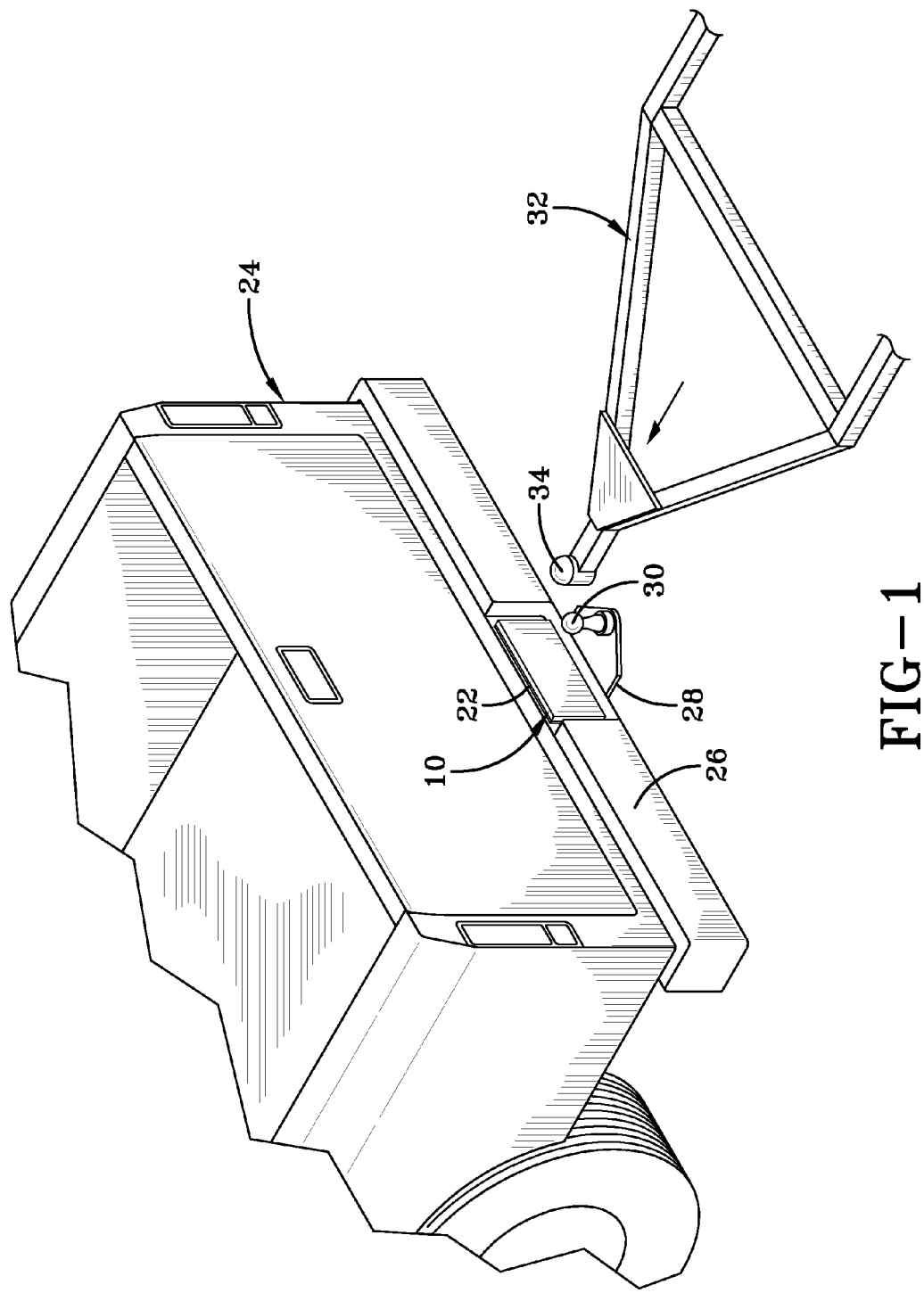
FIG. 1 is a perspective view of the license plate protector attached on and covering a license plate on a rear portion of a vehicle at the rear bumper location and a portion of a trailer.

With reference to FIG. 1, a removable license plate protector 10 is shown covering a license plate 22 attached to the rear bumper 26 of a vehicle 24. As illustrated, the bumper 26 has a ball hitch 30 attached in a depressed portion 28 of the bumper 26. A portion of a trailer 32 and the tongue 34 of a trailer hitch assembly is also illustrated. The present invention provides protection from impact from a trailer tongue 34 as a vehicle 24 is being rearwardly maneuvered to attach a trailer 32 to the rear bumper 26 of the vehicle 24. In many occasions as the vehicle 24 is being moved or backed in a direction toward the tongue 34 of the trailer 32 it has been known to impact the license plate 22 severely damaging and bending the license plate 22, in some cases even cutting through the metal of the license plate 22. In order to prevent this from happening, various devices have been proposed that are permanently attached to either the bumper 26 or covering the license plate 22. These devices are inferior in that they provide a permanent impediment to viewing the license plate 22 and are unnecessary under normal operations. It has been determined that the only time the license plate 22 needs to be protected is during attachment of a trailer 32 when direct impacts to the license plate 22 can occur. The present invention provides a simple and quick way of attaching a license plate protector 10 directly covering the license plate 22 during this situation.

Figure 2:
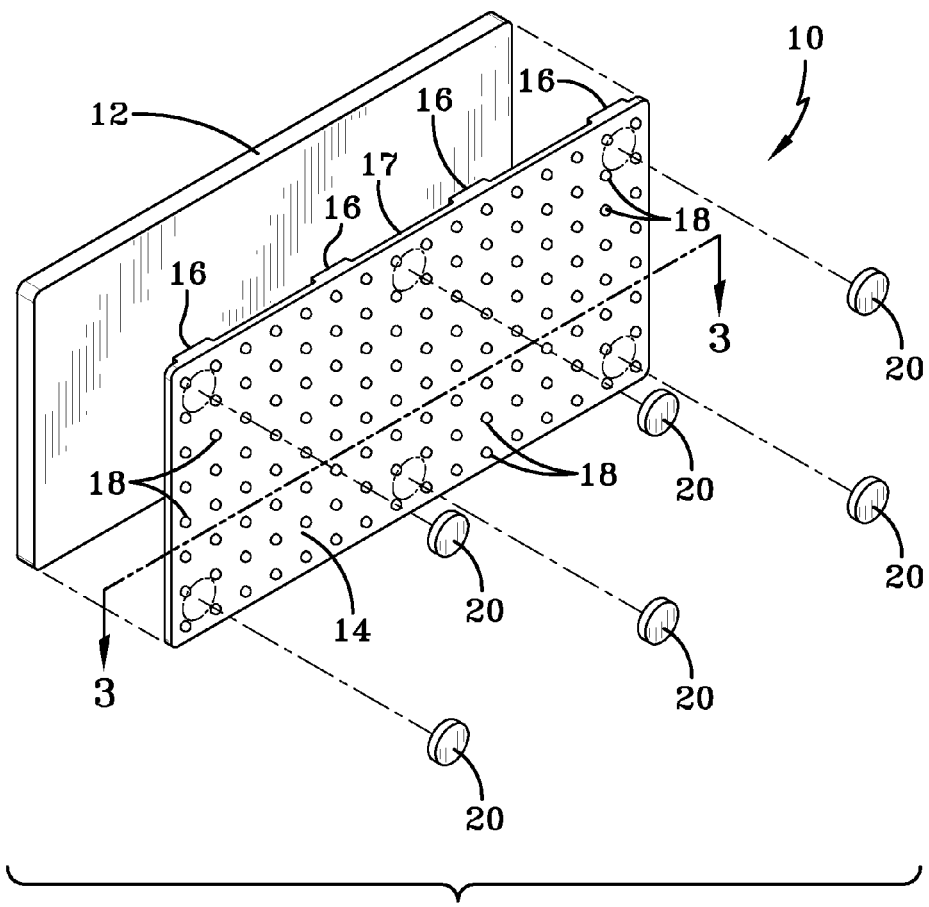
FIG. 2 is a perspective view of the rear side of the license protector shown in an exploded view.

The removable license protector 10 as shown in FIG. 1 is also shown in FIG. 2 in an exploded view where the various components of the license plate protector 10 can be seen in greater detail. The license plate protector 10 includes an outer impact plate 12, an impact bumper 14 and at least one permanent magnet 20 affixed to the exterior surface of the impact bumper 14. As shown, the outer impact plate 12 is preferably made of steel or some other material sufficiently strong to absorb an impact, preferably the impact plate 12 is made of a gauge thickness of approximately 0.030 of an inch or greater. This thickness ensures that the impact plate 12 itself cannot easily be cut through by impacting a tongue 34 of a trailer 32 when the vehicle 24 is backed up. On the interior surface of the impact plate 12 is permanently attached an impact bumper 14 made of a resilient material. The impact bumper 14 preferably is bonded, molded or glued directly onto the inner surface of the metal impact plate 12.

The impact bumper 14 is made of an elastomeric material. The elastomeric material may be a rubber, urethane or other thermoplastic or thermoset composition having sufficient resiliency to compress under impact loads.

Figure 3:
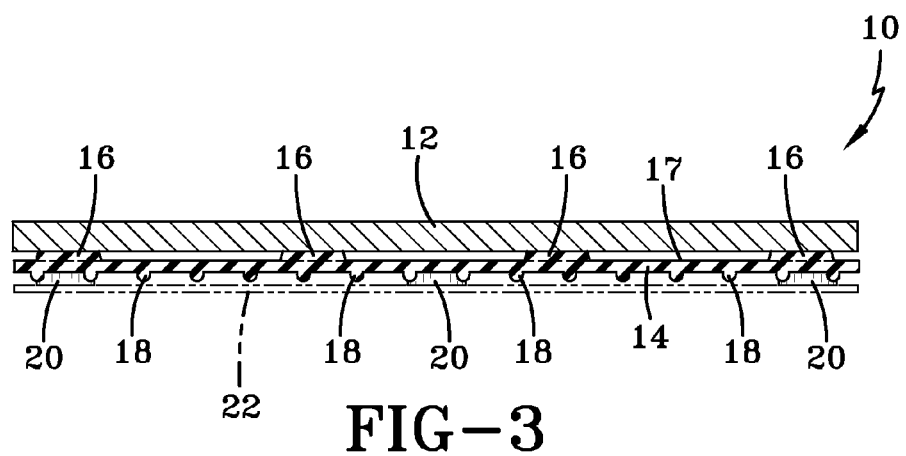
FIG. 3 is a cross sectional view of the license plate protector taken from FIG. 1 as shown along line 3-3.

With reference to FIG. 3, the cross sectional view of the license plate protector 10 is illustrated. As shown in the preferred embodiment, the impact bumper 14 has a plurality of ribs 16 spaced by grooves 17. The ribs 16 are affixed to the inner surface of the impact plate 12 by molding, bonding, gluing or otherwise vulcanizing directly to the metal impact plate 12. The grooves 17 provide voids to allow the impact plate 12 to flex under impact loads. On the exterior surface of the impact bumper 14 are shown a plurality of contact bumps 18 or projections spaced on the exterior surface of the impact bumper 14 for compressing against the license plate 22 when the license plate protector 10 is impacted by a trailer tongue 34. The impact bumper 14 preferably has a cross sectional thickness sufficiently large to allow the impact plate 12 to be deflected under loads as the impact bumper 14 compresses. As shown the impact bumper 14 has a thickness of at least 0.375 inches, preferably 0.5 inches or greater. In order to reduce the amount of material used in the manufacture of the impact bumper 14, the ribs 16 increase the total thickness of the bumper 14 as the grooves 17 provide sufficiently large voids. The plurality of projections 18 which stick up approximately ⅛ inch or greater from the surface of the impact bumper 14 provide the additional cross sectional thickness of the overall bumper 14 without adding a large amount of mass of resilient material. This greatly reduces the weight and the cost of the impact bumper 14. Alternatively, the impact bumper 14 can be made of a solid, thinner resilient material if desired. The impact bumper 14 can be provided with an elastomeric magnetized material such that the impact bumper 14 itself incorporates the permanent magnet 20 feature described hereinafter, to magnetically attach the protector 10 to a license plate 22.

With reference to the means of attaching the removable license plate protector 10 to a metal license plate 22 there is provided at least one permanent magnet 20. As discussed this permanent magnet 20 could be incorporated into the elastomeric material or alternatively may be provided as a separate component that is molded into the elastomeric bumper 14 as illustrated in FIGS. 2 and 3. As shown, it is possible to provide the permanent magnet 20 such that it extends along a peripheral edge of the impact bumper 14 in such a fashion that it attaches to the top of a license plate 22. In this way the removable license plate protector 10 can be magnetically attached or detached quite easily to a license plate 22 to protect it during this trailer hitch attachment procedure. The at least one permanent magnet 20 can utilize two or more permanent magnets 20 along this top peripheral edge if so desired. Alternatively four or more magnets 20 may be provided, with one magnet 20 attached near each corner of the impact bumper 14. In this fashion the magnets 20 are sufficiently spaced along corners of the device such that if the trailer tongue 34 impacts the license plate protector 10 directly in the location where the magnet 20 is located, the energy will absorb by the impact bumper 14 positioned between the magnet 20 and the impact plate 12. In this fashion only the outer edges of the license plate 22 away from any of the lettering could be impacted directly on a magnet 20 location, however the resiliency of the impact bumper 14 is sufficient that it can absorb this energy without damaging the license plate 22. In all other locations when the impact occurs the license plate protector 10 will have the metal plate 12 flex and deflect slightly forcing the impact bumper 14 to move directly into contact with the license plate 22, however due to its resiliency and ability to absorb energy the license plate 22 will not be damaged due to this impact. As shown in a preferred embodiment the permanent magnets 20 are made of six small round disks that are bonded, molded or otherwise affixed to the impact bumper 14. As shown all of these magnets 20 are positioned around the peripheral edges of the impact bumper 14. By having the impact plate 12 and the impact bumper 14 approximating the size of the license plate 22 to be protected the assembly completely 10 covers the underlying license plate 22 to be protected. Once the trailer hitch 34 is attached the removable license plate protector 10 is simply pulled from the license plate 22 and detached and stored either into the trailer 32 or into the vehicle 24.

While the license plate protector 10 is shown utilizing these primarily three components 12, 14, 20, it is understood that alternatively the permanent magnet 20 can be incorporated directly into the impact bumper 14 and as such this device 10 can be made as a two component device with an internal magnetic capability being provided in the impact bumper 14 itself. In such a case this is considered at least one permanent magnet 20 providing the attachment for the license plate protector 10. Alternatively multiple magnets 20 can be used as illustrated to provide the necessary magnetic force required to ensure that the license plate protector 10 does not detach during an impact of a trailer hitch 34. Ideally the permanent magnets 20 project sufficiently from the impact bumper 14 to permit the magnets 20 to contact the metal license plate 22 directly insuring a strong magnetic hold.

As a further alternative the impact plate 12 and impact bumper 14 can be molded as a one piece molded construction or component wherein the impact plate portion 12 is provided at one exterior surface of the license plate protector device 10 and the impact bumper 14 is on the opposite surface. The resultant device made of one plastic or rubber material or two different materials co-molded together with the impact bumper portion 14 being more flexible and the impact plate portion 12 being more stiff. The two portions 12, 14 being molded together to form the resultant device wherein the impact bumper portion 14 would either be a magnetic material or have at least one magnet 20 affixed to it to hold the device to the license plate 22 of the vehicle 24 as described above.

The impact plate or plate portion 12 can have painted or molded or otherwise applied advertising, patterns, logos or personalized words or numerals on the exterior surface.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

I claim:

1. A removable protector for magnetic attachment to a license plate, the license plate being affixed to a rear bumper of a vehicle above a trailer hitch, the removable protector comprises:
    an outer metal impact plate, the metal impact plate being a stiff plate having a gauge thickness of 0.030 inches or greater and being the size of a license plate or slightly greater, the gauge thickness ensures the metal impact plate cannot be cut through by an impacting tongue of a trailer;
    an impact bumper made of a resilient elastomeric material permanently affixed to an inner surface of the metal impact plate and being of the same size as the license plate and having a thickness of at least 0.375 inches, the cross sectional thickness being sufficiently large to allow the impact plate to be deflected under loads as the impact bumper compresses; and
    at least one permanent magnet permanently affixed to an exterior surface of the impact bumper, the at least one permanent magnet positioned to attach magnetically to cover and protect a metal license plate screwed to a vehicle rear bumper thereby providing an easy magnetic attachment and detachment of the protector to the metal license plate of the vehicle, thereby providing impact damage protection of the license plate during attachment of a trailer to the vehicle hitch.

2. The removable protector for magnetic attachment to a license plate, the license plate being affixed to a rear bumper of a vehicle above a trailer hitch, the removable protector of claim 1 wherein the impact plate and the impact bumper are molded together as a one piece construction.

3. The removable protector for magnetic attachment to a license plate, the license plate being affixed to a rear bumper of a vehicle above a trailer hitch, the removable protector of claim 2 wherein the elastomeric material of the impact bumper is made from rubber, urethane or other thermoplastic composition have sufficient resiliency to compress under impact.

4. The removable protector for magnetic attachment to a license plate, the license plate being affixed to a rear bumper of a vehicle above a trailer hitch, the removable protector of claim 2 wherein the impact bumper has a plurality of contact bumps or projections spaced on an exterior surface impact bumper for compressing against a license plate when the license plate protector is impacted.

5. The removable protector for magnetic attachment to a license plate, the license plate being affixed to a rear bumper of a vehicle above a trailer hitch, the removable protector of claim 1 wherein the impact bumper is an elastomeric material permanently bonded, glued or molded onto the inner surface of the impact plate.

6. The removable protector for magnetic attachment to a license plate, the license plate being affixed to a rear bumper of a vehicle above a trailer hitch, the removable protector of claim 5 wherein the impact bumper has a plurality of ribs spaced by grooves, the ribs being affixed to the inner surface of the impact plate and the grooves provide voids to allow the impact plate to flex under impact loads.

7. The removable protector for magnetic attachment to a license plate, the license plate being affixed to a rear bumper of a vehicle above a trailer hitch, the removable protector of claim 1 wherein the at least one permanent magnet is located near an edge of the impact bumper to enable the magnet to attach to a top surface of a license plate.

8. The removable protector for magnetic attachment to a license plate, the license plate being affixed to a rear bumper of a vehicle above a trailer hitch, the removable protector of claim 7 comprises two or more permanent magnets.

9. The removable protector for magnetic attachment to a license plate, the license plate being affixed to a rear bumper of a vehicle above a trailer hitch, the removable protector of claim 8 comprises four or more permanent magnets, one attached near corners of the impact bumper.

10. The removable protector for magnetic attachment to a license plate, the license plate being affixed to a rear bumper of a vehicle above a trailer hitch, the removable protector of claim 9 comprises six or more permanent magnets around peripheral edges of the impact bumper.

11. The removable protector for magnetic attachment to a license plate, the license plate being affixed to a rear bumper of a vehicle above a trailer hitch, the removable protector of claim 10 wherein the permanent magnets are round disks bonded, molded into or otherwise affixed to the impact bumper.

12. A removable protector for magnetic attachment to a license plate, the license plate being affixed to a rear bumper of a vehicle above a trailer hitch, the removable protector comprises:

an outer impact plate portion and an inner impact bumper portion made as a one piece construction of plastic or rubber or two materials co-molded together with the impact bumper portion being more flexible relative to the more stiff impact plate, the impact plate portion having a gauge thickness of 0.030 inches or greater and being the size of a license plate or slightly greater, the gauge thickness ensures the metal impact plate cannot be cut through by an impacting tongue of a trailer and at least one permanent magnet integrally formed in the impact bumper portion or permanently affixed to an exterior surface of the impact bumper portion, the at least one permanent magnet positioned to attach the protector magnetically and to cover and protect a metal license plate screwed to a vehicle rear bumper thereby providing an easy magnetic attachment and detachment of the protector to the metal license plate, thereby providing impact damage protection of the license plate during attachment of a trailer to the vehicle hitch, the inner impact bumper having a thickness of at least 0.375 inches, the cross sectional thickness being sufficiently large to allow the impact plate to be deflected under loads as the impact bumper compresses.

* * * * *